US007109476B2

(12) United States Patent
Hanold et al.

(10) Patent No.: US 7,109,476 B2
(45) Date of Patent: Sep. 19, 2006

(54) MULTIPLE ION SOURCES INVOLVING ATMOSPHERIC PRESSURE PHOTOIONIZATION

(75) Inventors: Karl A. Hanold, Huntington Beach, CA (US); Jack A. Syage, Huntington Beach, CA (US)

(73) Assignee: Syagen Technology, Tustin, CA (US)

( * ) Notice: Subject to any disclaimer, the term of this patent is extended or adjusted under 35 U.S.C. 154(b) by 0 days.

(21) Appl. No.: 10/672,958

(22) Filed: Sep. 24, 2003

(65) Prior Publication Data

US 2004/0119009 A1 Jun. 24, 2004

(51) Int. Cl.
*B01D 59/44* (2006.01)

(52) U.S. Cl. ........................ 250/288; 250/281; 250/285

(58) Field of Classification Search ................. 250/288
See application file for complete search history.

(56) References Cited

U.S. PATENT DOCUMENTS

| | | | |
|---|---|---|---|
| 3,555,272 | A | 1/1971 | Munson et al. |
| 4,014,793 | A | 3/1977 | Tesarik et al. |
| 4,365,157 | A | 12/1982 | Unsold et al. |
| 4,517,850 | A | 5/1985 | Wiseman et al. |
| 4,540,884 | A | 9/1985 | Stafford et al. |
| 4,733,073 | A | 3/1988 | Becker et al. |
| 4,780,608 | A | 10/1988 | Cross et al. |
| 4,804,846 | A | 2/1989 | Hall |
| 4,849,628 | A | 7/1989 | McLuckey et al. |
| 4,855,594 | A | 8/1989 | Kimock et al. |
| 4,861,988 | A | 8/1989 | Henion et al. |
| 4,876,502 | A | 10/1989 | Verbanets et al. |
| 4,931,640 | A | 6/1990 | Marshall et al. |
| 5,032,721 | A | 7/1991 | Bacon et al. |
| 5,068,658 | A | 11/1991 | Ohlsson et al. |
| 5,070,240 | A | 12/1991 | Lee et al. |
| 5,138,552 | A | 8/1992 | Weedon et al. |
| 5,153,672 | A | 10/1992 | Globig et al. |
| 5,198,816 | A | 3/1993 | Kalinowski et al. |
| 5,206,594 | A | 4/1993 | Zipf |
| 5,234,838 | A | 8/1993 | Bacon, Jr. |
| 5,248,973 | A | 9/1993 | Babu et al. |
| 5,283,436 | A | 2/1994 | Wang |
| 5,289,529 | A | 2/1994 | Karnowski |
| 5,294,797 | A | 3/1994 | Frey et al. |
| 5,311,016 | A | 5/1994 | Villa-Aleman |
| 5,338,931 | A | 8/1994 | Spangler et al. |

(Continued)

OTHER PUBLICATIONS

Mahon, et al, "Third-Harmonic Generatin in Argon, Krypton, and Xenon: Bandwidth Limitations in the Vicinity of Lyman-a", IEEE Journal of Quantum Electronics, vol. QE-15, No. 6, Jun. 1979, pp. 444-451.

(Continued)

*Primary Examiner*—Nikita Wells
*Assistant Examiner*—Phillip A. Johnston
(74) *Attorney, Agent, or Firm*—Ben J. Yorks; Irell & Manella LLP

(57) ABSTRACT

A monitor that has multiple ioniziation sources that can be switched between different modes. The monitor may have an electrostatic ionizer and a photoionizer that ionize at approximately atmospheric pressure. Activation of the ionizers is controlled by a switch. The switch can activate the ionizers in accordance with a plurality of modes. For example, the switch may create modes where the ionizers are activated sequentially or simultaneously. The monitor may further have a chemical ionizer that is controlled by the switch to activate in a plurality of modes. The modes may be switched to detect different trace molecules of a sample loaded into an ionization chamber. The ionizers are preferably located at orthogonal angles relative to each other.

82 Claims, 7 Drawing Sheets

U.S. PATENT DOCUMENTS

| | | | |
|---|---|---|---|
| 5,343,488 A | 8/1994 | Guyot et al. | |
| 5,381,006 A | 1/1995 | Wells et al. | |
| 5,393,979 A | 2/1995 | Hsi | |
| 5,397,895 A | 3/1995 | Leone et al. | |
| 5,412,207 A | 5/1995 | Micco et al. | |
| 5,422,575 A | 6/1995 | Ferrer et al. | |
| 5,422,643 A | 6/1995 | Chu et al. | |
| 5,469,323 A | 11/1995 | Kanayama | |
| 5,504,328 A | 4/1996 | Bonser | |
| 5,527,731 A | 6/1996 | Yamamoto et al. | |
| 5,554,846 A | 9/1996 | Regiec et al. | |
| 5,568,144 A | 10/1996 | Chiao et al. | |
| 5,569,917 A | 10/1996 | Buttrill, Jr. et al. | |
| 5,630,221 A | 5/1997 | Birleson | |
| 5,631,462 A | 5/1997 | Reents, Jr. | |
| 5,808,299 A | 9/1998 | Syage | |
| 5,826,214 A | 10/1998 | Lieb et al. | |
| 5,854,431 A | 12/1998 | Linker et al. | |
| 6,410,914 B1 * | 6/2002 | Park et al. | 250/288 |

OTHER PUBLICATIONS

Rettner, et al, "Pulsed Free Jets: Novel Nonlinear Media for Generation of Vacuum Ultraviolet and Extreme Ultraviolet Radiation", The Journal of Physical Chemistry, vol. 88, No. 20, 1984, pp. 4459-4465.

Tonkyn, et al, "Compact Vacuum Ultraviolet Source for Photoelectron Spectroscopy", Rev. Sci. Instrum. vol. 60, No. 7, Jul. 1989, pp. 1245-1251.

R. Wallenstein, "Generation of Narrowband Tunable VUV Radiation at the Lyman-a Wavelength", Optics Communications, vol. 33, No. 1, Apr. 1980, pp. 119-122.

R. Hilbig, et al, "Tunable VUV Radiation Generated by Two-Photon Resonant Frequency Mixing in Xenon", IEEE Journal of Quantum Electronics, vol. QE-19, No. 2, Feb. 1983, pp. 194-201.

Jack A. Syage, "Real-Time Detection of Chemical Agents Using Molecular Beam Laser Mass Spectrometry", American Chemical Society, 1990.

David M. Lubman, "Lasers and Mass Spectrometry", Oxford University Press, 1990, pp. 469-489.

Nesselrodt, et al., "Cyclic Ketone Mixture Analysis Using 2+1 Resonance-Enhanced Multiphoton Ionization Mass Spectrometry", Analystical Chemistry, vol. 66, pp. 2497-2504, 1994.

R. Frey, et al. "Real-Time Vehicle Exhaust Analysis Using a Laser TOF Mass Spectrometer" Proc. 40t$^{h}$ Anal. Conf. Mass Spectrom & Allied Topics, 1992, pp. 678-679.

R. Tembreull, et al. "Pulsed Laser Desorption of Biological Molecules in Supersonic Beam Mass Spectrometry with Resonant Two-Photon Ionization Detection".

Steven M. Michael, "An Ion Trap Storage/Time-of-Flight Mass Spectrometer", Rev. Sci. Instrum., vol. 63, No. 10, pp. 4277-4284, Oct. 1992.

Mark G. Qian et al, "A Hybrid instrument That Combines TOF With The Ion Trap Yields Excellent Sensitivity For Small Samples", Analytical Chemistry, vol. 67, No. 7; pp. 234-242, Apr. 1, 1995.

E.R. Rohwer, R.C. Beavis,C. Koster, J. Lindner, J. Grotemeyer and E.W. Schlag, "Fast Pulsed Laser Induced Electron Generation for Electron Impace Mass Spectrometry", Nov. 23, 1988, pp. 1151-1153.

J.G. Boyle, L.D. Pfefferle, E.E. Gulcicek, S.D. Colson, "Laser-driven Electron Ionization for a VUV Photoionization Time-Of-Flight Mass Spectrometer", Rev. Sci. Instrum., vol. 62, No. 2, pp. 323-333, Feb. 1991.

P.Y. Cheng and H.L. Dai, "A Photoemitted Electron-Impact Ionization Method For Time-Of-Flight Mass Spectrometers", Rev. Sci. Instrum. vol. 64, No. 8, pp. 2211-2214, Aug. 1993.

U. Boesl et al. "Laser Ion Sources For Time-Of-Flight Mass Spectrometry", Int. J. Mass Spectrom. Ion Processes 131 (1994) 87-124.

* cited by examiner

MULTIPLE ION SOURCES INVOLVING ATMOSPHERIC PRESSURE PHOTOIONIZATION

BACKGROUND OF THE INVENTION

1. Field of the Invention

The present invention relates to a monitor such as a mass spectrometer that can detect trace molecules from a sample.

2. Background Information

Mass spectrometers are typically used to detect one or more trace molecules from a sample. For example, a mass spectrometer can be used to detect the existence of toxic or otherwise dangerous compounds in a room. Mass spectrometers are also used to analyze drug compounds in solvents. Mass spectrometers typically ionize trace molecules from a gas sample and then deflect the ionized molecules into a detector. The molecules may be contained in a liquid sample which is typically volatilized using heat and a flow of gas such as nitrogen to help break up the liquid stream into small aerosol particles. The gaseous molecules can then be ionized by techniques such as atmospheric pressure photoionization (APPI) and atmospheric pressure chemical ionization (APCI). Another method for ionizing molecules in liquid is by electrospray ionization (ESI). In the ESI method a liquid stream is charged by a voltage and the ionized molecules are released from the liquid stream in a process that creates aerosol droplets. The aerosol droplets can be further evaporated into isolated ions.

U.S. Pat. Nos. 6,211,516 and 6,329,653 issued to Syage et al. disclose a mass spectrometer that contains a photoionizer. The photoionizer includes a light source that can emit a light beam into a gas sample. The light beam has an energy that will ionize constituent molecules without creating an undesirable amount of fragmentation. The molecules can be ionized at pressures ranging from low to above atmospheric pressure. U.S. application Ser. No. 596,307 filed in the name of Syage et al. discloses embodiments of APPI sources. U.S. Pat. No. 6,534,765 issued to Robb. et al discloses an atmospheric pressure photoionization source that uses dopant molecules to increase ionization efficiency. APPI is emerging as an important technique in mass spectrometry.

It is generally desirable to provide a mass spectrometer; that can detect a number of different compounds; provides a strong parent molecular ion signal with minimal fragmentation; is minimally susceptible to interference and gives a linear response with concentration.

It would be desirable to provide a photoionizer that can handle large quantities of sample to use with various liquid flow sources such as liquid chromatography (LC) and separation columns. It would also be desirable to provide a photoionizer that ionizes analyte in liquid samples by a means other than thermal vaporization.

Finally it would be desirable to combine a photoionizer with other ionizers to extend the range of molecules that can be ionized. It is also desirable to simultaneously operate more than one ionizer and do so in a manner that provides rapid switching between different modes of operation.

BRIEF SUMMARY OF THE INVENTION

A monitor that can detect a plurality of trace molecules ionized in an ionizing chamber at approximately one atmosphere. The trace molecules can be ionized by a photoionizer and/or other ionizers coupled to the ionizer chamber. The monitor may have a switch that controls the operation of the ionizers to operate in a variety of different modes.

DETAILED DESCRIPTION OF THE PREFERRED EMBODIMENT

Disclosed is a monitor that has multiple ionization sources that can be switched between different modes. The monitor may have an electrospray ionizer ("ESI") and a photoionizer that ionize at approximately atmospheric pressure ("APPI"). Activation of the ionizers is controlled by a switch. The switch can activate the ionizers in accordance with a plurality of modes. For example, the switch may create modes where the ionizers are activated sequentially or simultaneously. The monitor may further have an atmospheric pressure chemical ionizer ("APCI") that is controlled by the switch to activate in a plurality of modes. The modes may be switched to detect different trace molecules of a sample loaded into an ionization chamber. The ionizers are preferably located at orthogonal angles relative to each other.

Figure 1:
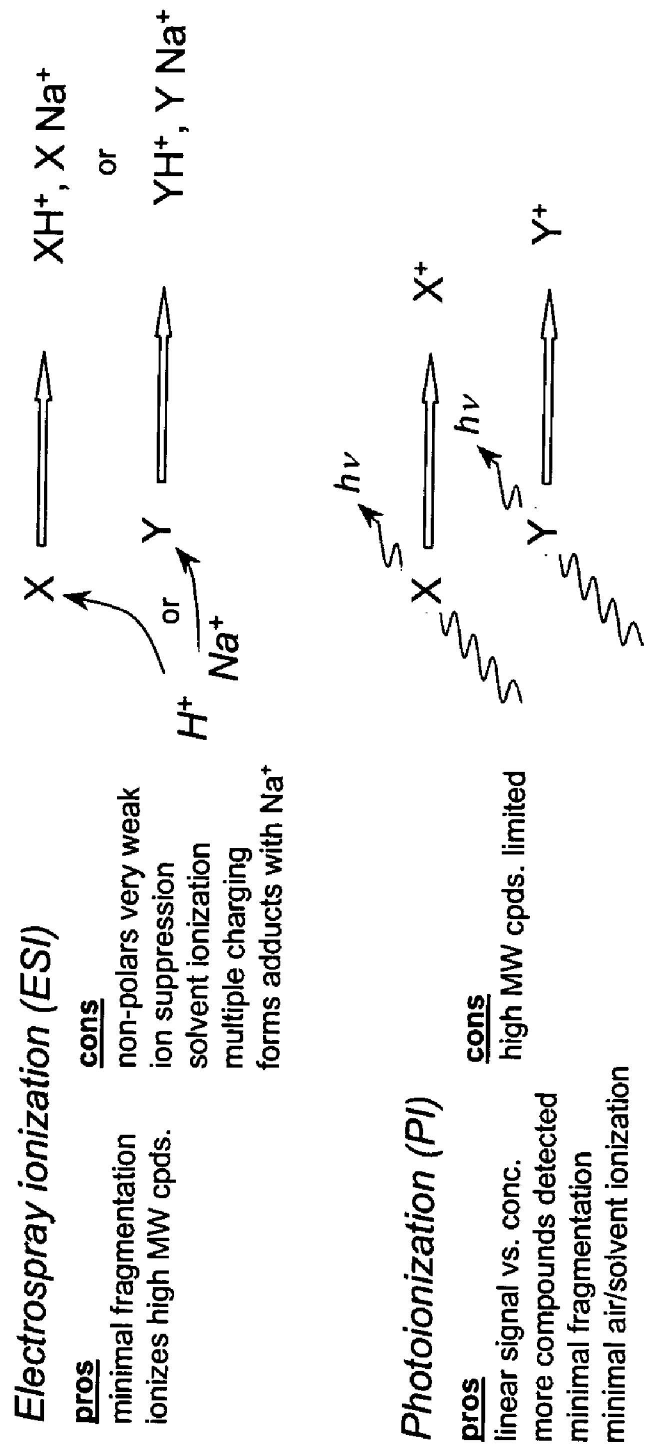
FIG. 1 is an illustration showing the ionization methods of electrospray ionization and photoionization.

Referring to the drawings more particularly by reference numbers, FIG. 1 illustrates the ionization mechanism for APPI and ESI and shows that these ionization sources have different benefits. Particularly, ESI is suitable for ionizing high molecular weight compounds that are not easily ionized by APPI. Conversely APPI is suitable for ionizing lower molecular weight compounds and non-polar compounds that are not easily ionized by ESI. Furthermore, APPI has advantages with regard to minimizing solvent ionization, adduct ions, and ion suppression compared to ESI.

Figure 2:
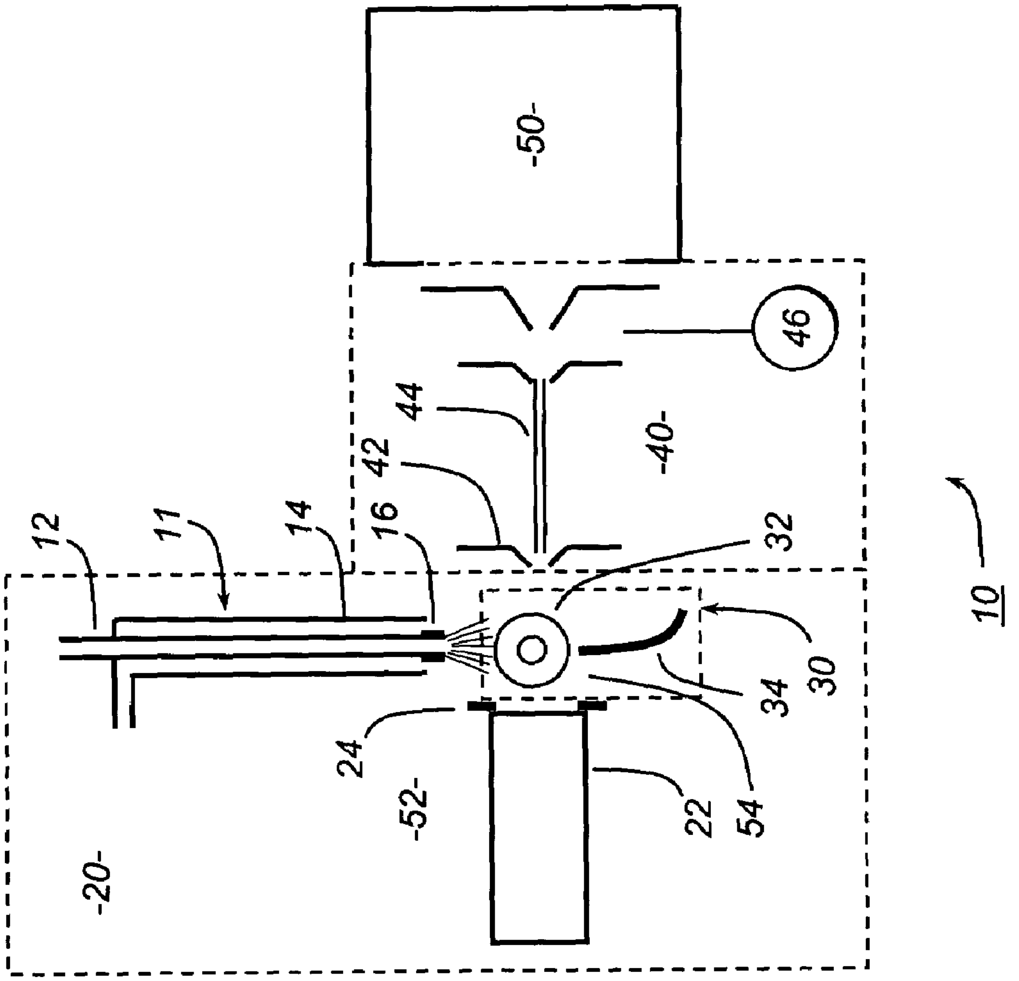
FIG. 2 is an illustration of an embodiment of a monitor.

FIG. 2 show's an embodiment of a monitor 10 of the present invention. The monitor 10 may include an electrospray ionizer 11 consisting of an inlet capillary 12, a gas flow tube 14, and a metallized capillary tip 16. The gas flow tube 14 can introduce a gas that assist in vaporizing a sample that flows through the inlet 12. The monitor 10 may also include a photoionizer 22 which may contain an electrode 24. The monitor 10 may also include an APCI source 30 consisting of an inner liquid flow and an outer gas flow 32 and a discharge needle 34 to effect ionization. The combined ionization sources 20 may be coupled to a detector 50 by a vacuum interface 40. The vacuum interface consists of an inlet skimmer or aperture 42, a capillary interface 44, a pump 46, and may consist of other skimmers and inlets into the detector 50. The ionizers can be attached to a monitor housing 52 that has an ionizing chamber 54. The ionizing chamber 54 typically operates at approximately one atmosphere.

The preferred embodiment ESI 11 and APCI 30 vaporizers are orthogonal to the entrance 42 of the vacuum interface 40. Orthogonality is defined as a range of angles of 45° to 135° relative to the axis defined by the entrance aperture 42 inlet gas flow. The APPI light source 22 may have a range of angles that does not interfere with the ESI and APCI assemblies. The APPI may be orthogonal to both the ESI and the APCI.

The use of all three ionizers APPI, APCI, and ESI can be operated with separate vaporizers for APCI 30 and ESI 11. The use of the three ionizers may also be operated with just the ESI 11 inlet flow. The APCI discharge needle 34 can be positioned to ionize the vaporized liquid flow from the ESI source 11.

Figure 3:
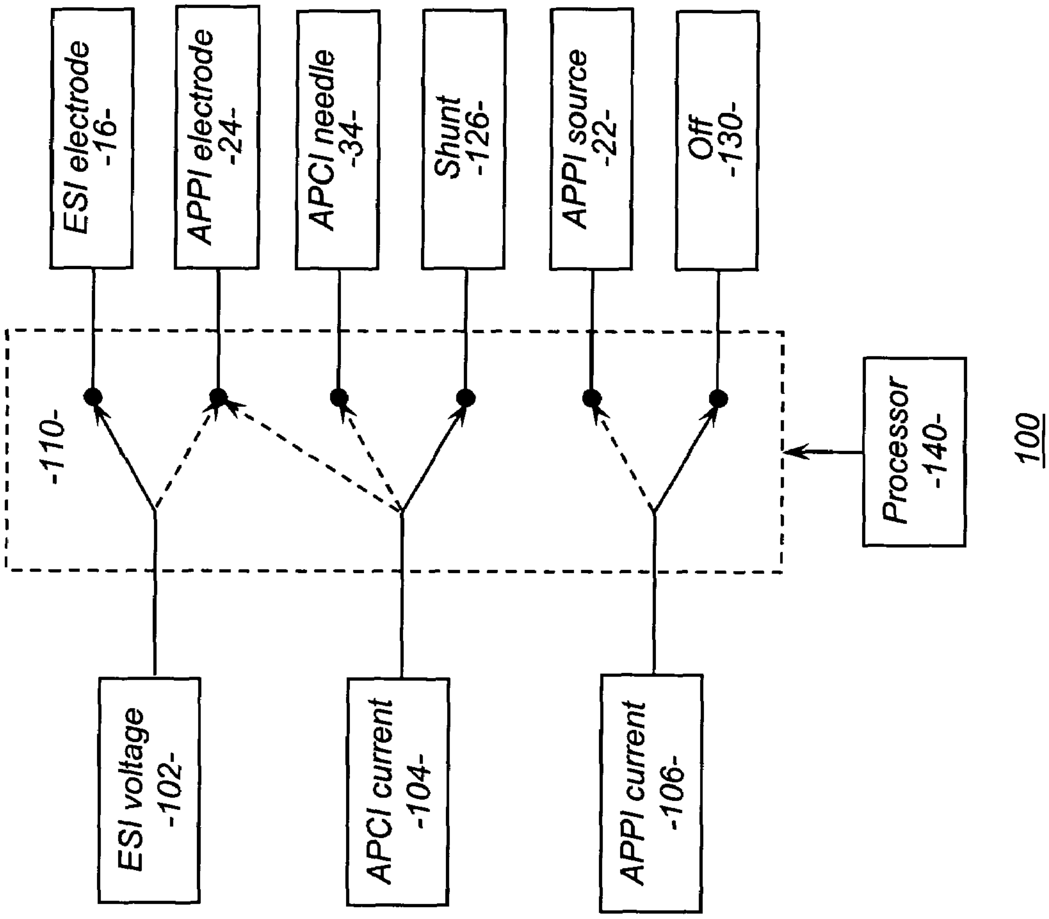
FIG. 3 is a block diagram for switching between different ionization sources.

FIG. 3 diagrams the operation of the ESI, APCI, and APPI sources. A control system 100 consists of a switching circuit 110 and a processor 140. The switching circuit directs source voltage and current to the various ionizer components from voltage 102 and current sources 104 and 106, respectively. The processor 140 can control the switch 110.

For ESI operation a voltage difference is applied from the metallized electrode 16 to the entrance of the vacuum interface 42 (see FIG. 1). For positive ion detection, either a high positive voltage is applied to 16, with 42 at ground potential, or a negative voltage is applied to 42, while 16 is maintained at a ground potential. Intermediate voltages may be applied to 16 and 42 to achieve a similar voltage difference. For negative ion detection, voltages of opposite polarity are applied. A typical range of voltages applied to 16 for positive ion detection is about 500 to 3000 V. The optimum voltage value is dependent on the distance between 16 and 42. These conditions are known from prior art.

For operation of more than one mode of ionization it may be desirable to turn off the ESI source while another ionizer is operating. It may also be desirable to operate more than one ionizer at the same time. The following description pertains to operation of both ESI and APPI in a dual ionizer mode. For a mode of operation where the ESI source is not required the ESI voltage 102 may be switched off from the ESI source 11. The APPI electrode 24 may assist in directing the ions to the entrance 42 of the vacuum interface 40 of the detector 50. For switching between ESI and APPI the ESI voltage source 102 may be switched between electrode 16 and 24. In another mode of operation the ESI voltage may be applied to both 16 and 24 at the same time. This may assist in directing ESI ions to the entrance 42 even if the APPI source 22 is off. It may also be the mode of operation for simultaneous operation of ESI and APPI. The APPI current 106 may also be applied to the APPI source 22, or to an off mode 130. This switch permits the ESI and APPI sources to operate independently, or in a switched mode. The APPI current drives the gas discharge of the APPI source to generate ionizing photons. Many types of gas discharges can be used and the driver circuits are known in the prior art. In another mode the photoionizer is on and the ESI is switched between on and off states, or vice versa.

The following description pertains to operation of the APCI source 30 in combination with APPI, or in combination with APPI and ESI in a triple ionizer mode.

The APCI source operates by passing a current through the APCI needle 34 as known by prior art methods. The current flows through a resistor (not shown) that creates a voltage at the APCI needle 34. This voltage creates the potential difference between the needle and a ground plane needed to sustain the APCI discharge. The APCI source may be turned off by turning the current off or by shunting the current to ground through a shunt resistor, when the switch is in the shunt mode 126. In this mode the voltage created by the shunt resistor may be used as a useful voltage for the APPI electrode 24. By way of example, a current of 15 microamps terminated by a 30 megaohm resistor would create a voltage drop of 450 volts. The APPI can be operated with the APCI source either sequentially or simultaneously.

The APCI current 104 may be switched between the APCI needle 34 and the APPI electrode 24 to switch between APCI and APPI. In another mode of operation the APCI current may be applied to both 34 and 24 at the same time. This may assist in directing APCI ions to the entrance 42 even if the APPI source 22 is off. It may also be the mode of operation for simultaneous operation of APCI and APPI. The APPI current 106 may also be applied to the APPI source 22 or to the off mode 130. This switch permits the APCI and APPI sources to operate independently, or in a switched mode.

All three ionizers, ESI source 11, APPI source 22, and APCI source 30 may be operated simultaneously in a switched mode. For simultaneous operation either the voltage from the APCI needle current, or the voltage from the ESI source, may be used for the APPI electrode 24. The APPI source can also operate without the electrode 24 or with other electrode structures to steer the ions to the entrance aperture 42.

The following description pertains to operating the different ionizers in negative ion detection mode. This is affected by reversing the voltage polarities on the ESI metal tip 16, the APPI electrode 24 and the APCI needle 34. The modes of operation of the multiple ionizers for negative ion detection can be similar to that described above for positive ion detection. All of the modes for both positive and negative ion generation may be defined and controlled by the processor 140.

Figure 4B:
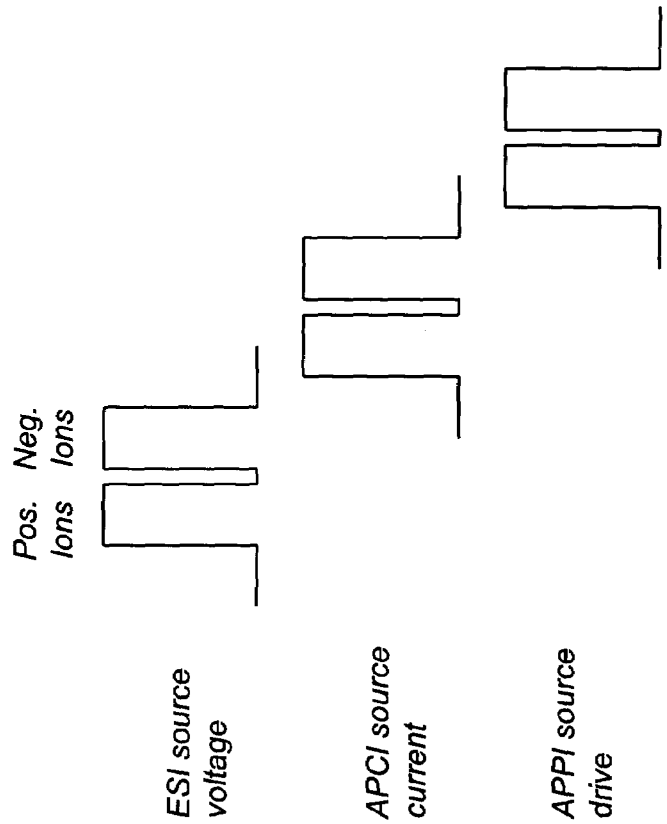
FIGS. 4A–B are timing diagrams for switching between different sources and for switching between positive and negative ions.
Figure 4A:
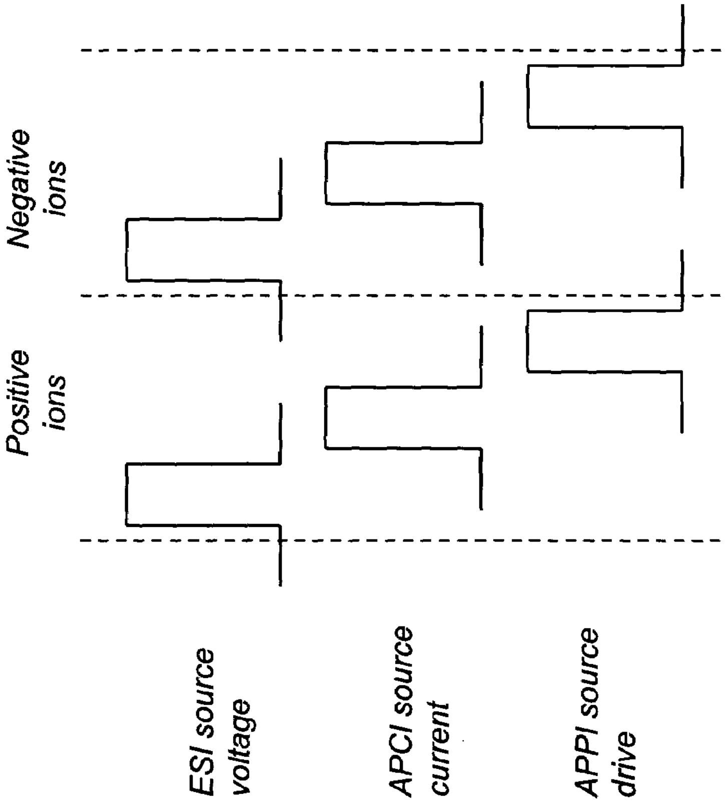

FIGS. 4A and 4B are timing diagrams showing different modes of operation for sequential switching of the ESI, APCI, and APPI sources for both positive and negative ion detection. In FIG. 4A, the sequence is based on switching the ionizers while detecting positive ions and then changing voltage polarity to detect negative ions. This sequence can be repeated continuously. Another mode of operation is shown in FIG. 4B. In this case the voltage polarities are changed for a fixed ionizer mode so that positive and negative ions are detected for one ionizer and then the sequence is repeated for the next ionizer. In the sequences of FIGS. 4A and 4B there are 6 modes; 3 for the different ionizers, and 2 for the different ion charges. The preference for one sequence versus another will depend on how quickly ionizers can be switched relative to voltage polarities. Not only must the voltage polarities described above be switched, but electronics in the detector 50 may also require voltage polarity switches to detect positive and negative ions.

It should be noted that the sequences in FIGS. 4A and 4B can also be effected for two ionizers rather than three, such as APPI with ESI, or APPI with APCI. It is also possible to operate two ionizers simultaneously and switch to the third ionizer. For example, the user could switch between APPI and ESI/APCI, or ESI and APPI/APCI, or APCI and APPI/ESI.

Figure 5:
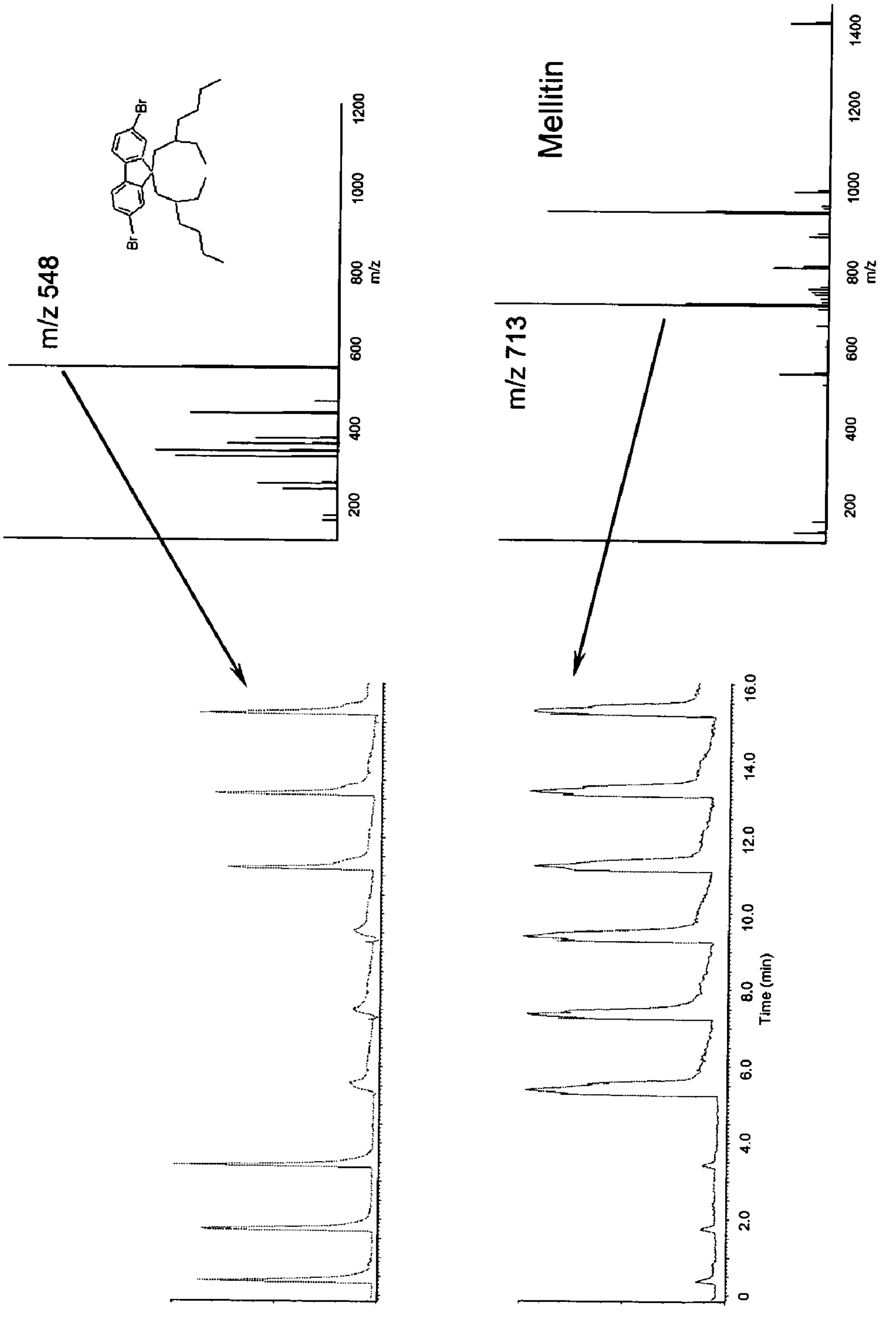
FIG. 5 is a graph showing the results of switching between electrospray and photoionization sources.

FIG. 5 shows results of switching between APPI and ESI. In this example a sample consisting of melittin and a drug analyte were analyzed. Ion chromatograms were recorded by measuring the intensity of a characteristic ion for each compound. FIG. 5 also shows the mass spectrum consisting of multiple ions for each compound. In the first part of the analysis, the APPI source only was on for three injections of sample and then the ESI source only was on for the next three injections. For this sample the drug analyte was ionized efficiently by APPI but not by ESI. Similarly, melittin was ionized efficiently by ESI, but not by APPI.

This shows the benefit of operating both APPI and ESI for detecting the maximum number of compounds in a sample.

In FIG. 5, the last three injections of sample were recorded for the APPI and ESI sources operating in rapid switching mode. In this way chromatograms show up for both compounds. The rapid switching mode is useful for chromatographic studies where different compounds will elute from the chromatographic column at different times with fairly narrow time widths. Rapid switching of ionizers provides a higher probability of detecting eluting compounds. A similar switching strategy using both positive and negative ion detection also can improve detection probability.

Figure 6:
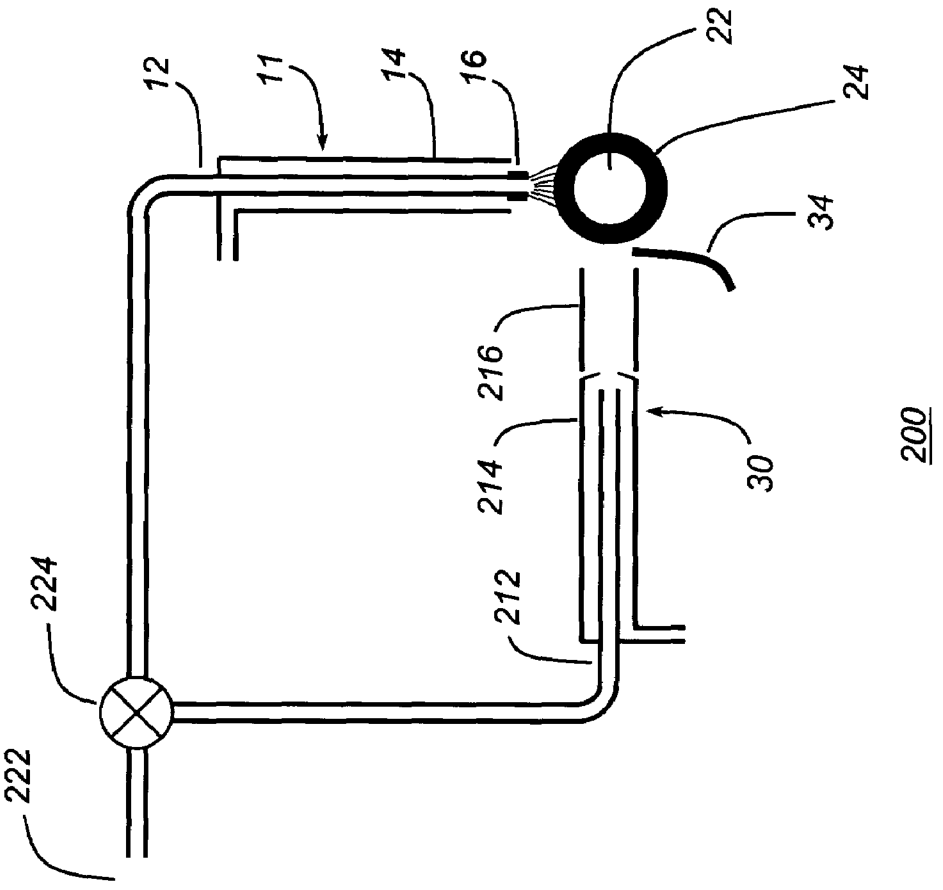
FIG. 6 is an illustration showing sample flow switching methods for use with an ESI and APCI vaporizer.

The following discussion pertains to the methods for introducing sample to the multiple ionizers and refers to FIG. 6. This view is rotated relative to FIG. 2 in order to show the heated nebulizer/vaporizer 30 for the APCI source. For dual operation involving APPI and APCI, the sample is introduced through the standard vaporizer 30. The vaporizer 30 consists of an inner tube 212 through which pressurized liquid sample flows and an outer tube 214 through which pressured gas flows. The liquid and gas mix at the their respective tube exits to cause the liquid to break apart into small aerosol particles that can then be thermally evaporated with the assistance of a hot surface 216. For dual operation involving APPI and ESI, the sample is also introduced through the ESI source 11.

Figure 7:
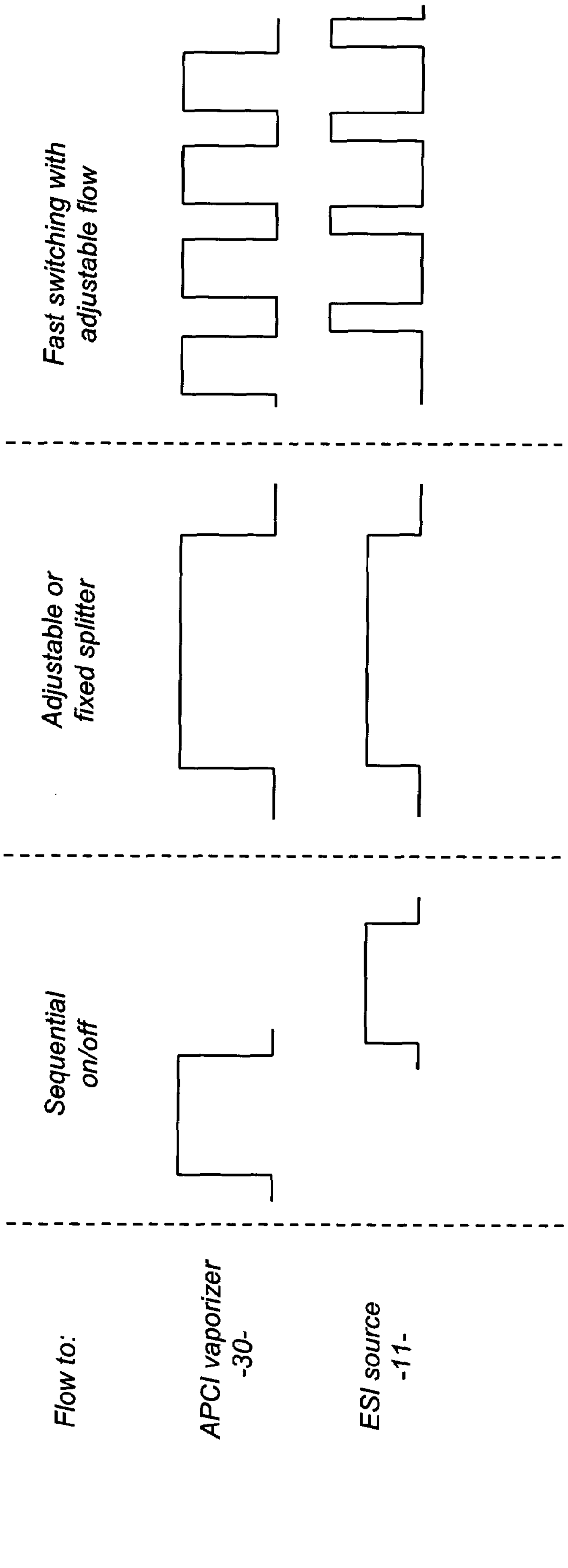
FIG. 7 is a timing diagram for different methods for switching liquid flow for use with an ESI and APCI vaporizer.

For operation of the three ionizers APPI, APCI, and ESI, the liquid sample flow must be split into two flows or switched between the APCI vaporizer 30 and the ESI source 11. The control of flow through the ESI and APCI can be controlled by a valve 224. FIG. 7 diagrams methods for achieving this. One method of switching involves sequential on/off where the valve 224 diverts flow to either the APCI vaporizer 30 or the ESI source 11. This valve may also provide a flow of solvent to the device that is not receiving the sample flow. Another method uses an adjustable or fixed splitter valve 224 to provide sample flow to both the APCI vaporizer 30 and the ESI source 11. The flow rate to these devices may be different and may be set by fixing or adjusting the splitter 224. Another method is based on fast switching to rapidly alternate the sample flow to the APCI vaporizer 30 and the ESI source 11. The duration of the flow to either device can be adjusted to control the overall average flow rate to the APCI vaporizer 30 and the ESI source 11. The valve 224 may be controlled by the processor 140 to be consistent with the mode of operation of the ionizers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A monitor that can detect a plurality of trace molecules, comprising:

a housing with an ionizing chamber that is approximately at one atmosphere and a single sample inlet that allows a sample to flow into said ionizing chamber;

a photoionizer that is coupled to said ionizing chamber and can be activated and deactivated to ionize the sample;

an electrospray ionizer coupled to said ionizing chamber and can be activated and deactivated to ionize the sample;

a switch that activates and deactivates said photoionizer and said electrospray ionizer to control different modes of operation; and, a detector that is coupled to said ionizing chamber.

2. The monitor of claim 1, wherein said electrospray ionizer includes a vaporizer.

3. The monitor of claim 1, further comprising a chemical ionizer coupled to said ionizing chamber and said switch.

4. The monitor of claim 3, wherein said chemical ionizer includes a vaporizer.

5. The monitor of claim 2, further comprising a vacuum interface coupled to said ionizing chamber and said detector, said vacuum interface having an entrance that is orthogonal to said electrospray ionizer vaporizer.

6. The monitor of claim 4, further comprising a vacuum interface coupled to said ionizing chamber and said detector, said vacuum interface having an entrance that is orthogonal to said electrospray ionizer vaporizer.

7. The monitor of claim 1, further comprising a processor that controls said switch.

8. The monitor of claim 1, wherein said switch operates in a mode where said electrospray ionizer and said photoionizer are sequentially activated.

9. The monitor of claim 1, wherein said switch operates in a mode where said electrospray ionizer and said photoionizer are simultaneously activated.

10. The monitor of claim 8, wherein said switch operates in a mode wherein said electrospray ionizer and said photoionizer each generates a positive ion, then each generates a negative ion.

11. The monitor of claim 8, wherein said switch operates in a mode wherein said electrospray ionizer and said photoionizer each generates pairs of positive and negative ions sequentially in time.

12. The monitor of claim 1, wherein said switch operates in a mode where said photoionizer is on and said electrospray ionizer is switched between on and off states.

13. The monitor of claim 1, wherein said switch operates in a mode wherein said electrospray ionizer is on and said photoionizer is switched between on and off states.

14. The monitor of claim 1, wherein said electrospray ionizer and said photoionizer each have an electrode that is supplied a voltage from a same voltage source.

15. The monitor of claim 9, further comprising a chemical ionizer that is coupled to said switch and generates a positive ion sequentially with said electrospray ionizer and said photoionizer, and then generates a negative ion sequentially with said electrospray ionizer and said photoionizer.

16. The monitor of claim 10, further comprising a chemical ionizer that is coupled to said switch and generates a positive and negative ion pair sequentially with said electrospray ionizer and said photoionizer.

17. The monitor of claim 1, further comprising a valve that controls a flow of a sample through an inlet of said electrospray ionizer and an inlet of said photoionizer.

18. The monitor of claim 17, wherein said valve sequentially allows the sample to flow through said electrospray ionizer inlet and said photoionizer inlet.

19. The monitor of claim 17, wherein said valve simultaneously allows the sample to flow through said electrospray ionizer inlet and said photoionizer inlet.

20. The monitor of claim 17, wherein said valve creates different flow rates through said electrospray ionizer inlet and said photoionizer inlet.

21. A monitor that can detect a plurality of trace molecules, comprising:

a housing with an ionizing chamber that is approximately at one atmosphere and a single sample inlet that allows a sample to flow into said ionizing chamber;

a photoionizer that is coupled to said ionizing chamber and can be activated and deactivated to ionize the sample;

an electrospray ionizer coupled to said ionizing chamber and can be activated and deactivated to ionize the sample;

switch means for controlling the operation of said photoionizer and said electrospray ionizer to control different modes of operation; and, a detector that is coupled to said ionizing chamber.

22. The monitor of claim 21, wherein said electrospray ionizer includes a vaporizer.

23. The monitor of claim 21, further comprising a chemical ionizer coupled to said ionizing chamber and said switch means.

24. The monitor of claim 23, wherein said chemical ionizer includes a vaporizer.

25. The monitor of claim 22, further comprising a vacuum interface coupled to said ionizing chamber and said detector, said vacuum interface having an entrance that is orthogonal to said electrospray ionizer vaporizer.

26. The monitor of claim 24, further comprising a vacuum interface coupled to said ionizing chamber and said detector, said vacuum interface having an entrance that is orthogonal relative to said electrospray ionizer vaporizer.

27. The monitor of claim 21, further comprising a processor that controls said switch means.

28. The monitor of claim 21, wherein said switch means operates in a mode where said electrospray ionizer and said photoionizer are sequentially activated.

29. The monitor of claim 21, said switch means operates in a mode where said electrospray ionizer and said photoionizer are simultaneously activated.

30. The monitor of claim 28, wherein said switch means operates in a mode wherein said electrospray ionizer and said photoionizer each generates a positive ion, then each generates a negative ion.

31. The monitor of claim 28, wherein said switch means operates in a mode wherein said electrospray ionizer and said photoionizer each generates pairs of positive and negative ions sequentially in time.

32. The monitor of claim 21, wherein said switch means operates in a mode where said photoionizer is on and said electrospray ionizer is switched between on and off states.

33. The monitor of claim 21, wherein said switch means operates in a mode wherein electrospray ionizer is on and said photoionizer is switched between on and off states.

34. The monitor of claim 21, wherein said electrospray ionizer and said photoionizer each have an electrode that is supplied a voltage from a same voltage source.

35. The monitor of claim 30, further comprising a chemical ionizer that is coupled to said switch means to generate a positive ion sequentially with said electrospray ionizer and said photoionizer, and then generates a negative ion sequentially with said electrospray ionizer and said photoionizer.

36. The monitor of claim 30, further comprising a chemical ionizer that is coupled to said switch means to generate a positive and negative pair of ions sequentially with said electrospray ionizer and said photoionizer.

37. The monitor of claim 21, further comprising a valve that controls a flow of a sample through an inlet of said electrospray ionizer and an inlet of said photoionizer.

38. The monitor of claim 37, wherein said valve sequentially allows the sample to flow through said electrospray ionizer inlet and said photoionizer inlet.

39. The monitor of claim 37, wherein said valve simultaneously allows the sample to flow through said electrospray ionizer inlet and said photoionizer inlet.

40. The monitor of claim 37, wherein said valve creates different flowrates through said electrospray ionizer inlet and said photoionizer inlet.

41. A method for detecting a plurality of trace molecules, comprising:

introducing a sample into an ionizing chamber through a single sample inlet;

ionizing a trace molecule within the sample with a photoionizer at approximately atmospheric pressure;

ionizing a trace molecule within the sample with an electrospray ionizer at approximately atmospheric pressure;

detecting the ionized trace molecules; and, switching a mode of operation of the photoionizer and the electrospray ionizer by deactivating the photoionizer or the electrospray ionizer.

42. The method of claim 41, further comprising vaporizing a sample that contains the trace molecules.

43. The method of claim 41, further comprising ionizing a trace molecule with a chemical ionizer at approximately atmospheric pressure.

44. The method of claim 41, wherein the mode includes activating the electrospray ionizer and the photoionizer sequentially.

45. The method of claim 41, wherein the mode includes activating the electrospray ionizer and the photoionizer simultaneously.

46. The method of claim 44, wherein the mode includes activating the electrospray ionizer and the photoionizer so that each generates a positive ion, then each generates a negative ion.

47. The method of claim 44, wherein the mode includes activating the electrospray ionizer and the photoionizer so that each generates pairs of positive and negative ions sequentially in time.

48. The method of claim 41, wherein the mode includes maintaining the photoionizer on, while switching the electrospray ionizer between on and off states.

49. The method of claim 41, wherein the mode includes maintaining the electrospray ionizer on, while switching the photoionizer between on and off states.

50. The method of claim 44, further comprising ionizing a trace molecule with a chemical ionizer in a mode where the chemical ionizer generates a positive ion sequentially with the electrospray ionizer and the photoionizer, and then generates a negative ion sequentially with the electrospray ionizer and the photoionizer.

51. The method of claim 44, further comprising ionizing a trace molecule with a chemical ionizer in a mode where the chemical ionizer generates a positive and negative ion pair sequentially with the electrospray ionizer and photoionizer.

52. The method of claim 41, wherein a sample with the trace molecules sequentially flows through an electrospray ionizer inlet and a photoionizer inlet.

53. The method of claim 41, wherein a sample with the trace molecules simultaneously flows through an electrospray ionizer inlet and a photoionizer inlet.

54. The method of claim 41, wherein a sample with the trace molecules flows through an electrospray ionizer inlet and a photoionizer inlet at different flow rates.

55. A monitor that can detect a plurality of trace molecules, comprising:

a housing with an ionizing chamber that is approximately at one atmosphere and a single sample inlet that allows a sample to flow into said ionizing chamber;

a photoionizer that is coupled to said ionizing chamber and can be activated and deactivate to ionize the sample;

a chemical ionizer coupled to said ionizing chamber and can be activated and deactivate to ionize the sample;

a switch that controls the operation of said photoionizer and said chemical ionizer to control different modes of operation; and, a detector that is coupled to said ionizing chamber.

56. The monitor of claim 55, wherein said chemical ionizer includes a vaporizer.

57. The monitor of claim 56, further comprising a vacuum interface coupled to said ionizing chamber and said detector, said vacuum interface having an entrance that is orthogonal to said chemical ionizer vaporizer.

58. The monitor of claim 55, further comprising a processor that controls said switch.

59. The monitor of claim 55, wherein said switch operates in a mode where said chemical ionizer and said photoionizer are sequentially activated.

60. The monitor of claim 55, wherein said switch operates in a mode where said chemical ionizer and said photoionizer are simultaneously activated.

61. The monitor of claim 59, wherein said switch operates in a mode wherein said chemical ionizer and said photoionizer each generates a positive ion, then each generates a negative ion.

62. The monitor of claim 59, wherein said switch operates in a mode wherein said chemical ionizer and said photoionizer each generates pairs of positive and negative ions sequentially in time.

63. The monitor of claim 55, wherein said switch operates in a mode where said photoionizer is on and said chemical ionizer is switched between on and off states.

64. The monitor of claim 55, wherein said switch operates in a mode wherein said chemical ionizer is on and said photoionizer is switched between on and off states.

65. A monitor that can detect a plurality of trace molecules, comprising:

a housing with an ionizing chamber that is approximately at one atmosphere and a single sample inlet that allows a sample to flow into said ionizing chamber;

a photoionizer that is coupled to said ionizing chamber and can be activated and deactivated to ionize the sample;

a chemical ionizer coupled to said ionizing chamber and can be activated and deactivated to ionize the sample;

switch means for controlling the operation of said photoionizer and said chemical ionizer to control different modes of operation; and, a detector that is coupled to said ionizing chamber.

66. The monitor of claim 65, wherein said chemical ionizer includes a vaporizer.

67. The monitor of claim 65, further comprising a vacuum interface coupled to said ionizing chamber and said detector, said vacuum interface having an entrance that is orthogonal to said chemical ionizer vaporizer.

68. The monitor of claim 65, further comprising a processor that controls said switch means.

69. The monitor of claim 65, wherein said switch means operates in a mode where said chemical ionizer and said photoionizer are sequentially activated.

70. The monitor of claim 65, said switch means operates in a mode where said chemical ionizer and said photoionizer are simultaneously activated.

71. The monitor of claim 69, wherein said switch means operates in a mode wherein said chemical ionizer and said photoionizer each generates a positive ion, then each generates a negative ion.

72. The monitor of claim 69, wherein said switch means operates in a mode wherein said chemical ionizer and said photoionizer each generates pairs of positive and negative ions sequentially in time.

73. The monitor of claim 65, wherein said switch means operates in a mode where said photoionizer is on and said chemical ionizer is switched between on and off states.

74. The monitor of claim 65, wherein said switch means operates in a mode wherein chemical ionizer is on and said photoionizer is switched between on and off states.

75. A method for detecting a plurality of trace molecules, comprising:

introducing a sample into an ionizing chamber through a single sample inlet;

ionizing a trace molecule within the sample with a photoionizer at approximately atmospheric pressure;

ionizing a trace molecule with the same with an chemical ionizer at approximately atmospheric pressure;

detecting the ionized trace molecules; and, switching a mode of operation of the photoionizer and the chemical ionizer by deactivating the photoionizer or the chemical ionizer.

76. The method of claim 75, further comprising vaporizing a sample that contains the trace molecules.

77. The method of claim 75, wherein the mode includes activating the chemical ionizer and the photoionizer sequentially.

78. The method of claim 75, wherein the mode includes activating the chemical ionizer and the photoionizer simultaneously.

79. The method of claim 77, wherein the mode includes activating the chemical ionizer and the photoionizer so that each generate a positive ion, then each generate a negative ion.

80. The method of claim 77, wherein the mode includes activating the chemical ionizer and the photoionizer so that each generate pairs of positive and negative ions sequentially in time.

81. The method of claim 75, wherein the mode includes maintaining the photoionizer on, while switching the chemical ionizer between on and off states.

82. The method of claim 75, wherein the mode includes maintaining the chemical ionizer on, while switching the photoionizer between on and off states.

* * * * *